Patented June 8, 1948

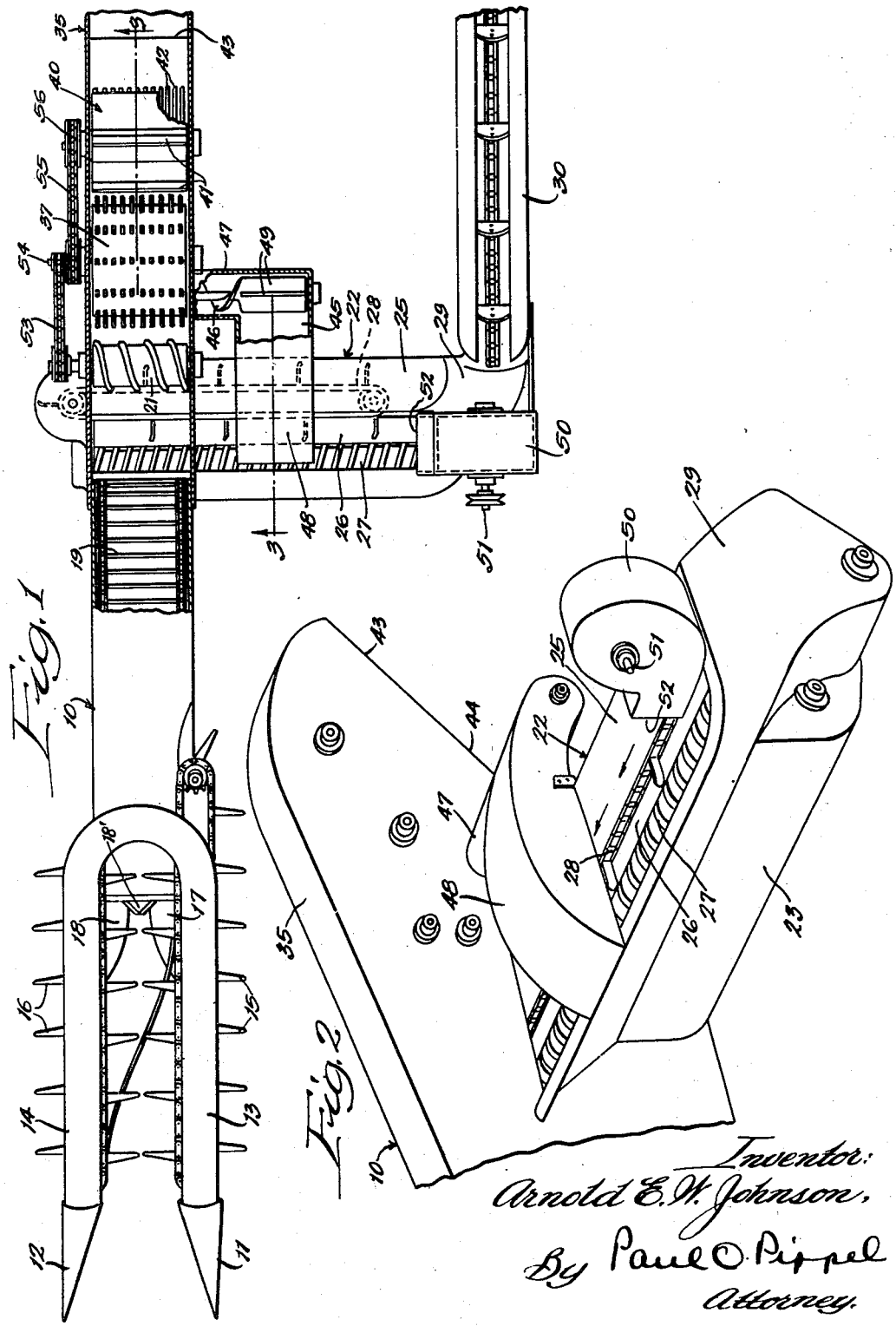

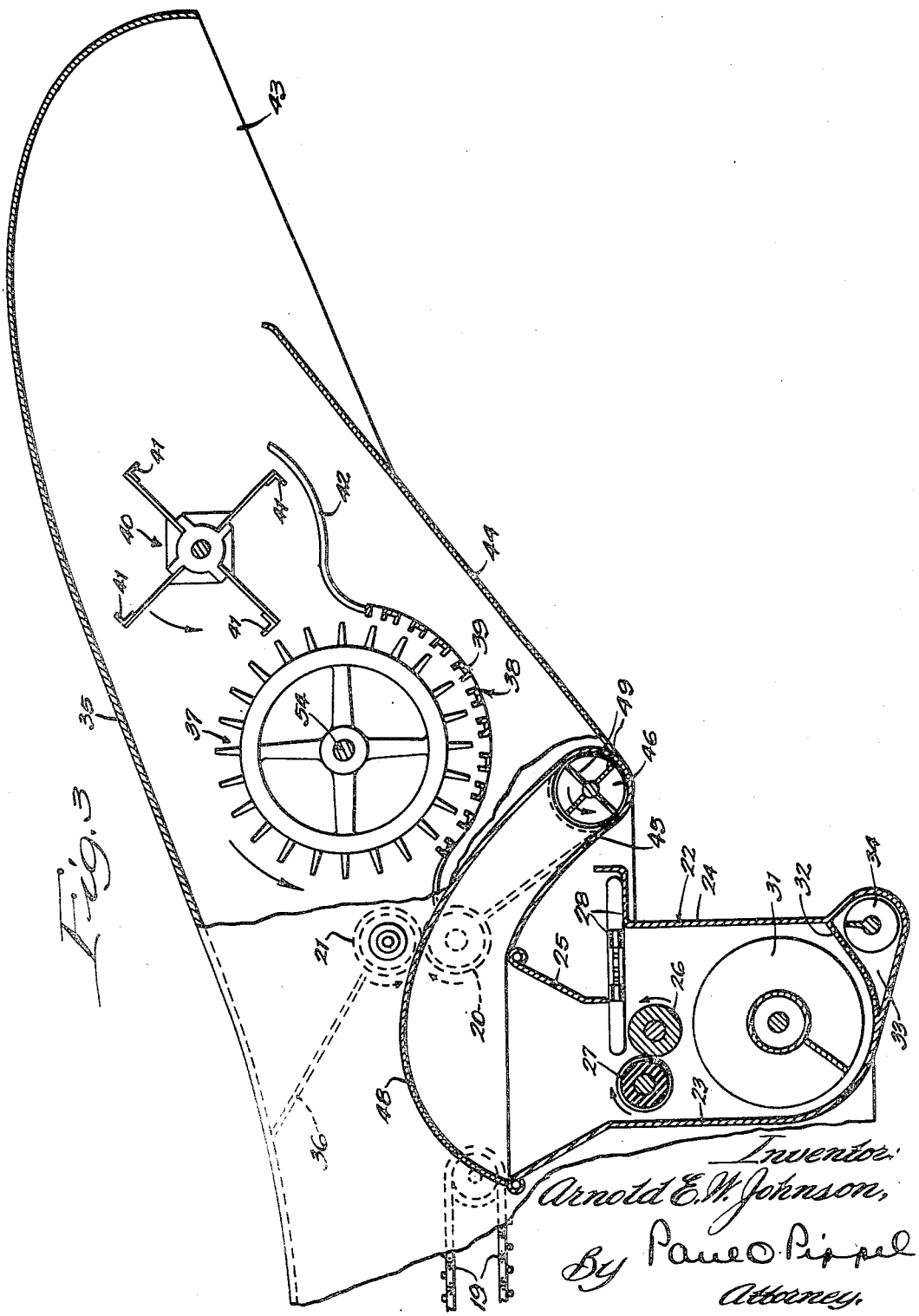

2,443,039

UNITED STATES PATENT OFFICE 2,443,039

SHREDDING AND SHELLED GRAIN SAVING ATTACHMENT FOR CORN HARVESTERS

Arnold E. W. Johnson, Oak Park, Ill., assignor to International Harvester Company, a corporation of New Jersey Application March 19, 1945, Serial No. 583,420

5 Claims. (Cl. 130—5)

This invention relates to a corn harvester. More specifically, it relates to a stalk-shredding and shelled-grain-recovery attachment for a corn harvester. As one method of harvesting corn, it has been proposed to sever the stalks by a traveling machine to convey the stalks to a snapping means and to husk the snapped ears. Such a method of harvesting may be accomplished by a machine such as shown in the McInturf Patent No. 879,404. The structure disclosed in this patent shows means for severing the stalks and delivering them heads first to snapping means, from which the stalks are delivered back onto the ground. In this harvesting method a substantial portion of the shelled grain lost by the conventional inclined-roll type of picker, in which the stalks remain standing in the field, is recovered. It has been found, however, that when the ears are snapped from the stalks the husks are often removed therewith and the snapping rolls engage the butt end of the ears in such a manner as to shell substantial amounts of corn therefrom, said shelled corn being retained in the husks which pass through the snapping rolls. For corn borer control and for other reasons, it has also been found desirable to shred the stalks which are delivered from the snapping rolls of a machine, as shown in the McInturf patent.

The principal object of the present invention is to provide an improved shredding attachment for stalk-severing types of corn harvesters.

Another principal object is to provide an effective grain-recovery means with simple structure for receiving grain from a stalk-treating means and delivering the grain to a suitable receptacle.

The above objects and others which will be apparent from the description to follow are accomplished by a cylinder and concave structure with grain receiving and conveying means therebeneath, as illustrated in the drawings, in which Figure 1 is a plan view illustrating the attachment of the invention as incorporated in a cut-off type of corn harvester;

Figure 2 is a perspective view showing the housing structure for the snapping and husking rolls of the harvester shown in Figure 1 with the grain conveying mechanism mounted in cooperation therewith;

Figure 3 is a section taken substantially on the line 3—3 of Figure 1.

In the drawings, particularly in Figure 1, the outline has been shown of an entire machine of the traveling type adapted to gather standing stalks, sever the stalks, convey them rearwardly in a substantially horizontal position, snap the ears therefrom, shred the stalks, husk the ears, and deliver the husked ears together with grain recovered from the shredding mechanism to an elevator. Such a machine may be on a horse-drawn frame structure or may be mounted in any suitable manner on a tractor. The copending application Serial No. 500,487, filed August 30, 1943, which became Patent No. 2,427,861 on September 23, 1947, discloses and claims specific features of a stalk-gathering, cutting, and conveying mechanism as illustrated diagrammatically in the drawings of this application. As it is necessary to illustrate and describe structure necessary to provide a background for the disclosure of this invention, certain housing structures have been indicated in outline and certain mechanisms have been diagrammatically illustrated. In a stalk-severing corn harvester of this type, the entire structure is built around a relatively narrow, longitudinally extending housing, which will be designated in its entirety by the reference character 10. At the forward end of said housing, the stalk-gathering points or shoes 11 and 12 are illustrated as being attached to the side portions 13 and 14 of a throat-forming structure into which the stalks pass during travel of the machine. The stalks are fed into the throat by conveyor chains 15 and 16 mounted in the side portions of the throat. At the rear end of the throat guides 17 and 18 are shown for feeding stalks into a reciprocating cutter including a conventional sickle element 18'. The severed stalks are carried rearwardly by the conveyor chains and are engaged by a horizontal conveyor 19 extending across the width of the center portion of the housing 10. The rear end of said conveyor is shown in Figure 3 on a larger scale. It is to be understood that the forward portion of the machine is not a significant part of the invention as its specific structure is disclosed and claimed in the identified pending application. The stalks delivered horizontally by the chain 19 longitudinally of the housing 10 reach the rear end portion of the machine where they are fed between a lower snapping roller 20 and an upper snapping roller 21. Said rollers may be mounted on the side walls of the housing in any suitable bearing structures and may be driven by any conventional mechanism such as commonly used on corn pickers and harvesters. The rolls are rotatable in the direction indicated by the arrows in Figure 3 whereby the stalks are fed therebetween in a rearward direction, the ears being snapped from the stalks whereby they drop downwardly transversely to the housing 10. A husker unit designated in its entirety by the reference character 22 is mounted beneath the housing 10 immediately forward of the snapping rolls 20 and 21. Said husking unit includes a front side wall 23, a rear side wall 24, and a flared wall hopper 25 extending along the upper part of the husking unit for receiving ears snapped from the rolls 20 and 21. The husking unit also includes conventional husking rolls 26 and 27 and an ear-forwarding chain 28. Said forwarding chain engages the ears below the snapping rolls and moves them laterally along the husking rolls where the husks are removed therefrom. The ears are delivered into an enclosed elevator hopper 29 at the end of the husking unit opposite the snapping rolls. Said ears are then received by an elevator 30 and delivered upwardly to a trailing wagon or other receiving means.

An auger conveyor 1 is illustrated below the husking rolls 26 and 27 for moving the husks laterally with respect to the husking rolls. A perforated bottom or grid 32 beneath the auger 31 allows the shelled grain to pass therethrough into a receiving chamber 33. Said grain is then delivered by an auger 34 into the elevator hopper 29 along with the husked ears.

Up to this point in the description, the mechanism described is in itself not comprehensive of the present invention and discloses only the structure necessary to provide a working environment of the structure of the invention.

The housing 10 extends rearwardly beyond the snapping rolls 20 and 21 into a hood portion 35. Said portion provides means for receiving the stalks from the snapping rolls 20 and 21 and delivering them rearwardly. It will be noted that a baffle wall 36 is illustrated in dotted lines in Figure 3 for assuring delivery of the stalks to the snapping rolls 20 and 21. As the stalks emerge rearwardly from said snapping rolls, they are engaged by a cylinder or beater 37. Said beater is similar to a threshing cylinder except that the teeth are larger and spaced circumferentially a greater distance. The stalks and husks engaged by said beater when rotated in the direction indicated by the arrow are dragged over a concave structure 38 including a plurality of spaced elements 39. The stalks may be shredded to any degree desired and the husks and stalks are thoroughly shaken to remove the shelled grains therefrom. Any type of rotating beater may be employed having any conventional type of fixed or freely pivoted teeth such as conventionally used in hammer mills and the like. The shredded or macerated stalks are delivered rearwardly from the beater 37 to a second beater 40 which has a plurality of elements 41 arranged around the periphery thereof for engaging and moving rearwardly the stalks and other material. A plurality of spaced, springlike rods 42, as indicated by the broken-away portion of Figure 1, provide a grid structure for further allowing the escape of grain and other small particles from the stalks, husks, and other material passing through the beater.

The beater 40 acts to discharge all material delivered thereto rearwardly and out through the open bottom portion 43 of the hood 35. An inclined wall 44, extending from side to side of the hood 35 forwardly and downwardly from the open end portion 43, provides a receiving floor for the grain and other material discharged by the beaters through the gridded openings therebeneath. A forward wall 45 extending rearwardly and downwardly cooperates with the floor 44 to provide a confining means for material discharged from the shredding and beating mechanism. The adjoining portions of the walls 44 and 45 are formed as a cylinder to receive the bottom portion of an auger conveyor 46. Said conveyor, as best shown in Figure 1, projects laterally into and through a cylindrical housing 47 which projects laterally a substantial distance from the housing 10. At its outer end the housing 47 is provided with a curved discharge conduit 48. Said conduit extends upwardly and over the receiving hopper 25 of the husking unit, being provided with a large, downwardly facing opening substantially the full width of said hopper. The auger 46 is provided with radial blades 49 of a length equivalent to the width of the discharge conduit 48. The auger is normally driven at a speed sufficient to act as a thrower with the blades throwing the grain into the conduit 48 whereby the grain is delivered by said conduit downwardly into the husking unit, whereby the grain falls through the husking rolls and is recovered by the grain-saving means of the husking unit.

A fan housing 50 is shown as being mounted at the elevator end of the husking unit. Said fan contains a rotor mounted on a shaft 51 and adapted to be driven for discharging air from an outlet nozzle or opening 52 on the fan housing in the location indicated by the arrows in Figure 2. This is a conventional construction and is utilized for eliminating weeds, trash, husks, pieces of stalks and other extraneous material from the ears which are delivered to the husking unit. In the construction of this invention said fan has another novel function. It will be noted that the air blast from the fan passes beneath the discharge opening of the grain delivery conduit 48 whereby the foreign material received from the shredding device is eliminated and only the heavier grains dropped down into the husking unit.

Certain chains have been illustrated in Figure 1 as indicating some of the drive construction. A chain 53 is shown connecting one of the snapping rolls with the drive shaft 54 for the shredder or beater unit 37. A chain 55 has also been indicated as connecting the said shaft 54 with a driving sprocket 56 mounted on the beater element 41. It is to be understood that power from a suitable source may be applied by any conventional means to the moving elements of the device as described.

Applicant has shown only a preferred embodiment of his shredding and grain-saving attachment for corn harvesters. It is to be understood that it is the intention to limit the invention only to the scope of the appended claims.

What is claimed is:

1. A shredding and shelled grain saving attachment for cut-off type corn pickers comprising in combination with transverse horizontal snapping rolls, means for feeding stalks in a substantially horizontal position longitudinally through said rolls, receiving means for the snapped ears, a stalk shredding mechanism mounted at the rear of said snapping rolls, said mechanism including a grid structure through which shelled grain is delivered during operation of the shredder, means for receiving said shelled grain and other material passing through the grid, auger means for transmitting said material laterally beyond the snapping rolls, said auger means including impeller means for throwing the material being fed thereto in a radial direction, and deflector means surrounding the impeller portion of said means and extending over the receiving means for the snapped ears arranged to deflect the material thrown thereagainst to said receiving means.

2. A shredding and shelled grain saving attachment for cut-off type corn pickers comprising in combination with transverse horizontal snapping rolls, means for feeding stalks in a substantially horizontal position longitudinally through said rolls, transverse husking rolls arranged forwardly of and below said snapping rolls, a stalk shredding mechanism mounted at the rear of said snapping rolls, said mechanism including a grid structure through which shelled grain is delivered during operation of the shredder, means for receiving said shelled grain and other material passing through the grid, auger means for transmitting said material laterally beyond the snapping rolls, said auger means including impeller means for throwing the material being fed thereto in a radial direction, and deflector means surrounding the impeller portion of said means arranged to deflect the material thrown thereagainst to the husking rolls.

3. A shredding and shelled grain saving attachment for a stalk-severing type corn picker comprising in combination with snapping rolls, means for feeding stalks in a substantialy horizontal position longitudinally through said rolls, husking rolls arranged forwardly of and below said snapping rolls, means for creating a blast of air over said husking rolls, a stalk shredding mechanism mounted at the rear of said snapping rolls, said mechanism including a grid structure through which shelled grain and small pieces of other material are delivered during operation of the shredder, means for receiving said shelled grain and other material passing through the grid, means for transferring said material to a receiving means, said means including means for delivering the material into the path of the air blast over the husking rolls whereby the pieces of stalks and other foreign material are removed from the shelled grain.

4. A shredding and shelled grain saving attachment for a stalk-severing type corn picker comprising in combination with transverse horizontal snapping rolls, means for feeding stalks in a substantially horizontal position longitudinally through said rolls, transverse husking rolls arranged forwardly of and below said snapping rolls, means for creating a blast of air over said husking rolls, a stalk shredding mechanism mounted at the rear of said snapping rolls, said mechanism including a grid structure through which shelled grain and small pieces of other material are delivered during operation of the shredder, means for receiving said shelled grain and other material passing through the grid, auger means for transferring said material laterally beyond the snapping rolls, said auger means including impeller means for throwing the material being fed thereto in a radial direction, and deflector means surrounding the impeller portion of said means arranged to deflect the material thrown thereagainst into the path of the air blast over the husking rolls whereby the pieces of stalks and other foreign material are removed from the shelled grain.

5. A shredding and shelled grain saving attachment for cut-off type corn pickers comprising in combination with snapping rolls, means for feeding stalks through said rolls, husking rolls arranged forwardly of and below said snapping rolls, a stalk shredding mechanism mounted at the rear of said snapping rolls, said mechanism including a grid structure through which shelled grain is delivered during operation of the shredder, means for receiving said shelled grain and other material passing through the grid, auger means for transmitting said material laterally beyond the snapping rolls, said auger means including impeller means for throwing the material being fed thereto in a radial direction, and deflector means surrounding the impeller portion of said means arranged to deflect the material thrown thereagainst to the husking rolls.

ARNOLD E. W. JOHNSON.

REFERENCES CITED

The following references are of record in the file of this patent:

UNITED STATES PATENTS

| Number | Name | Date |
| --- | --- | --- |
| 396,153 | Gillett | Jan. 15, 1889 |
| 762,639 | Kramer | June 14, 1904 |
| 773,530 | Sheasley | Oct. 25, 1904 |
| 784,907 | Welsh | Mar. 14, 1905 |
| 2,390,949 | Krause et al. | Dec. 11, 1945 |